Nov. 2, 1954  F. G. HUNDLEY  2,693,196
APPARATUS FOR DISPENSING MEASURED QUANTITIES OF LIQUID
Filed Feb. 10, 1951
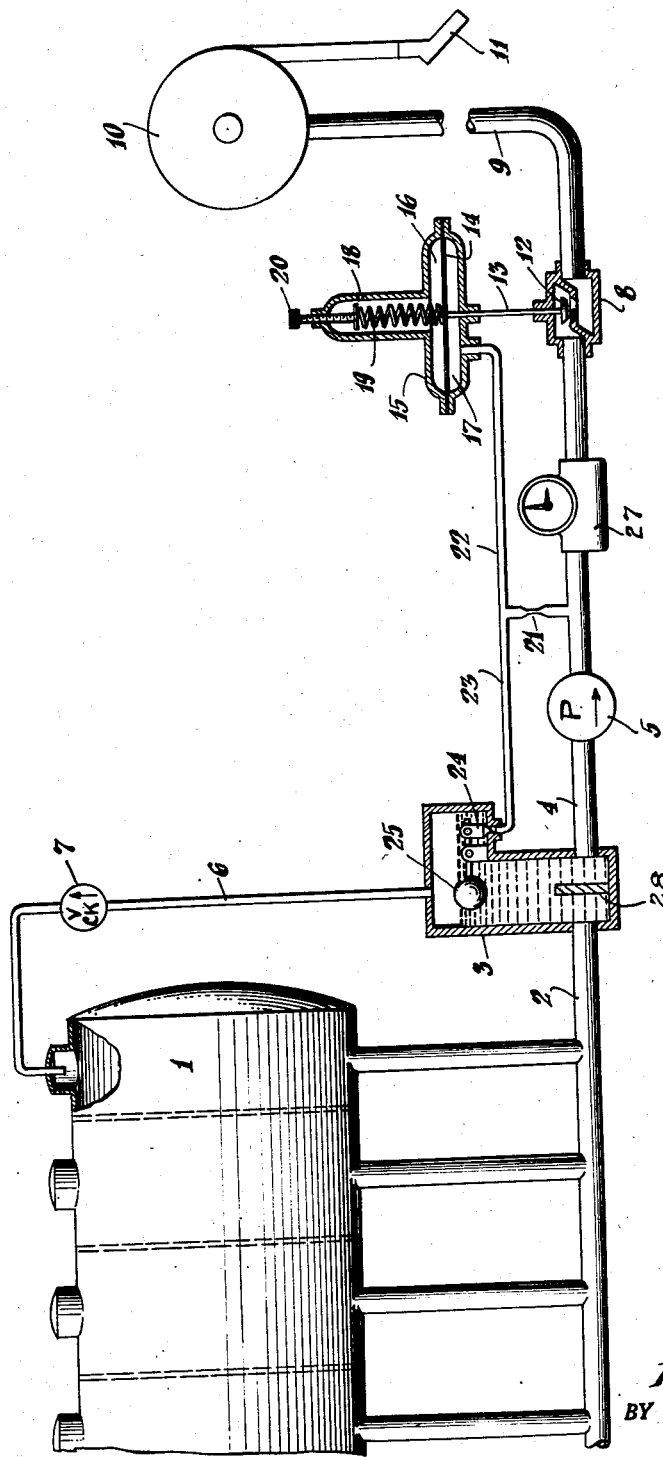
INVENTOR.
Frank G. Hundley
BY George H. Gurey
ATTORNEY

United States Patent Office 2,693,196
Patented Nov. 2, 1954

2,693,196

APPARATUS FOR DISPENSING MEASURED QUANTITIES OF LIQUID

Frank G. Hundley, Bayside, N. Y., assignor to Neptune Meter Company, a corporation of New Jersey Application February 10, 1951, Serial No. 210,399

7 Claims. (Cl. 137—195)

This invention relates to apparatus for dispensing measured quantities of liquid, and especially to measuring and dispensing apparatus which includes means for removing gases or vapors from the liquid prior to measurement of the flow.

It is well known that the presence of gas or vapor in a flowing liquid will disturb the accuracy of a flow measuring device. This is true of positive displacement volume measuring devices, and is also true of other volume measuring devices as well as rate of flow measuring devices.

It has been proposed to use in such apparatus a vapor trap in the line supplying the flow meter, so as to remove any gas or vapor before it gets to the meter. Such systems commonly include means for removing the accumulated vapor from the trap. It has also been proposed to provide mechanism for cutting off the flow through the meter when the volume of vapor in the trap becomes sufficiently large to give rise to danger of its being carried through the meter. Such systems of the prior art tend to be rather complicated, particularly with respect to the means for removing the accumulated vapor from the trap and the means for cutting off the flow when the vapor accumulation exceeds a predetermined volume. For example, it is customary in such prior art systems to provide a special pump for removing vapor from the trap.

An object of the present invention is to provide a simplified system of the type described, including improved means for removing the accumulated vapor from the trap.

Another object is to provide, in such a system, improved and simplified means for cutting off the flow of liquid in response to the accumulation of gas or vapor in the trap.

The foregoing and other objects of the invention are realized by providing a system including a supply reservoir of liquid, a pump located below the bottom of the reservoir and a vapor trap between the reservoir and the pump inlet. A vapor discharge conduit extends from the upper part of the trap to a point above the reservoir, this conduit being provided with a check valve which permits flow only in the direction away from the vapor trap. The pump discharges the liquid through a line which includes a meter and a cutoff valve. The cutoff is biased to closed position by a spring and is held open by a diaphragm subject to the discharge pressure of the pump. The conduit which conveys liquid at the pump discharge pressure to the diaphragm includes a fixed orifice. From this conduit, on the downstream side of the orifice, a bypass conduit leads back to the vapor trap, where it is controlled by a float valve so as to open when the liquid in the vapor trap falls below a predetermined level. When this valve opens, the pressure on the diaphragm is reduced due to the presence of the orifice and the spring is then effective to close the cutoff valve. With the cutoff valve closed, liquid flows from the supply reservoir into the vapor trap, forcing the accumulated vapor out through the check valve and raising the liquid level therein until the float closes the bypass valve, whereupon the pump discharge pressure is again effective to open the cutoff valve, and the pumping of liquid through the meter is resumed.

The single figure of the drawing shows, somewhat diagrammatically, one embodiment of the invention.

Referring to the drawing, there is shown a sectionalized supply tank 1 which discharges liquid, for example, gasoline, through a conduit 2, a vapor and air trap 3 and a conduit 4 to the inlet of a pump 5. A vapor discharge conduit 6 leads upwardly from the upward end of the vapor trap 3 through a check valve 7 to an outlet at the upper end of the supply tank 1.

Liquid is discharged from the pump through a meter 27, a cutoff valve 8 and a conduit 9 leading to a hose reel 10 and a discharge nozzle 11.

The valve 8 includes a valve head 12 operated by a stem 13 attached to a flexible diaphragm 14, which divides a casing 15 into opposed expansible chambers 16 and 17. The chamber 16 may be vented to the atmosphere as indicated at 18, to allow free movement of the diaphragm 14. A spring 19 within the chamber 16 biases the valve 12 toward closed position. The force of the spring 19 may be adjusted by a screw 20.

Liquid at the pump outlet pressure is supplied through an orifice 21 and a conduit 22 to the expansible chamber 17. A bypass conduit 23 leads from the conduit 22 on the downstream side of orifice 21 to the vapor trap 3. The outlet of conduit 23 is controlled by a bypass valve 24 operated by a float 25 in the vapor trap.

The vapor trap 3 and the pump 5 are both located below the lowest level of the tank 1, so that the pump inlet and the vapor trap are fed with liquid by gravity. The level of the other elements may be changed as desired.

When the system is operating normally, the gasoline or other liquid flows from the tank 1 through the conduit 2, vapor trap 3, conduit 4, pump 5, meter 27, cutoff valve 8, conduit 9, hose reel 10 and discharge nozzle 11. The level of the liquid in the trap 3 is sufficiently high so that the float 25 holds the bypass valve 24 closed. The pump outlet pressure is then communicated through orifice 21 and conduit 22 to the expansible chamber 17, where it acts upwardly against the diaphragm 14, holding valve 12 open against the spring 19.

The vapor trap 3 may be provided with a baffle 28 to insure that any vapor or air bubbles entrained in the liquid are deflected there and caused to rise to the surface. By locating the vapor trap ahead of the pump, it is insured that no vapor is present in the pump. If air or vapor were present there, it might produce a foaming condition, so that it would be very difficult to secure separation of the air or vapor from the liquid within a reasonable time after it had passed the pump.

Whenever the rate of flow through conduit 4 is less than the capacity of conduit 2, then the liquid tends to rise in vapor trap 3 and vapor discharge conduit 6 until it is even with the level in the tank 1. This occurs whenever the pump is stopped, or the cutoff valve 12 is closed, or when the flow is throttled at nozzle 11. When the level rises in trap 3 and conduit 6 in that manner, any vapor therein is forced out through check valve 7.

It will be understood that the check valve may be omitted provided the construction is such that the rate of flow through conduit 2, as determined by the gravity head and the dimensions of the conduit, is always greater than the flow through conduit 4. The use of the check valve permits the subatmospheric pressure developed by the pump to be transmitted back to the supply tank, thus increasing the effective head and thereby the rate of flow through the system. In other words, when the check valve 7 is provided, the rate of flow through conduits 2 and 4 is not limited by the gravity head.

For example, when liquid is being dispensed at a substantial rate, the suction or subatmospheric pressure at the inlet side of the pump is communicated through the vapor trap 3 and the conduit 6 to the check valve 7, which is then held closed by the difference between atmospheric pressure acting on its upper surface and the lower pressure acting on its under surface.

As the vapor accumulates in the trap 3, the liquid level therein is lowered and may at times be lowered sufficiently so that the float 25 falls and opens the bypass valve 24. A bypass for the pumped liquid is thereby provided through restriction 21, conduit 23, valve 24, the vapor trap 3 and conduit 4. The flow of liquid through this path produces a substantial drop in pressure across the restriction 21, so that the pressure in chamber 17 is reduced from the pump outlet pressure to a lower value. The force of the spring 19 is adjusted so that it can overcome this lower pressure acting on diaphragm 14 and move the valve 12 to closed position. Consequently, the flow of liquid through the meter 27 is cut off at a time when there is still an ample depth of liquid in the trap so that there is no danger of air or vapor being drawn into the pump. As soon as the valve 12 cuts off the flow, the gravity head of the supply tank 1 then causes the liquid to flow into the vapor trap and raise the level therein, forcing the accumulated vapor out through the conduit 6 and check valve 7. This continues until the level of the liquid in the vapor trap is raised sufficiently to lift the float 25 and close the bypass valve 24. When this valve closes, the bypass flow ceases, and the pressure on the downstream side of restriction 21 becomes the same as the pressure on its upstream side, namely the pump outlet pressure. This pressure is communicated to chamber 17, where it acts on the diaphragm 14 to open the valve 12 against the force of spring 19.

It is essential that the cutoff valve 8 be located downstream from the pump. If it were upstream from the pump, it would be difficult to get the pump discharge pressure up to the point where it could open the valve 8.

The meter 27 may be located either upstream or downstream from the valve 8, although it is preferable to have the meter on the upstream side, as shown, so that it is always under pressure.

The various compartments of tank 1 may be provided with individual discharge valves, if desired.

Any suitable type of pump may be used. It is well known that a centrifugal pump may have its flow cut off without stopping the pump. Positive displacement pumps are commonly provided with pressure relief valves which open when their discharge pressure exceeds a selected value. If a positive displacement pump is used in the present system, it should be provided with such a valve.

I claim:

1. Apparatus for dispensing gas-free liquid, comprising a reservoir for liquid, a pump located below the level of the reservoir, a conduit connecting the reservoir to the pump inlet so that the pump is fed by gravity, a vapor trap connected in said conduit for removing gases and vapors entrained in the liquid flowing therethrough, prior to reaching said pump, means operable to convey said gases and vapors from the vapor trap to a point above the level of the liquid in the reservoir, a discharge conduit receiving liquid from said pump, a cutoff valve in said discharge conduit, and means responsive to variations in the volume of gas and vapor accumulated in said trap and operatively connected to said cutoff valve to cause closure of the cutoff valve when said accumulation exceeds a predetermined volume.

2. Apparatus for dispensing gas-free liquid, comprising a reservoir for liquid, a pump located below the level of the reservoir, a conduit connecting the reservoir to the pump inlet so that the pump is fed by gravity, a vapor trap connected in said conduit for accumulating gases and vapors entrained in the liquid flowing therethrough prior to reaching said pump, a vapor discharge conduit leading from the upper end of the vapor trap to a point above the level of the liquid in the reservoir, a check valve in said vapor discharge conduit for preventing flow therethrough toward said vapor trap, a discharge conduit receiving liquid from said pump, a cutoff valve in said discharge conduit, means responsive to a change in the quantity of gases and vapors accumulated in said trap and means operatively connecting said quantity responsive means to said cutoff valve, said quantity responsive means and said connecting means cooperating when said quantity exceeds a predetermined value to cause closure of said cutoff valve, said vapor discharge conduit and check valve being effective at least when flow is terminated by said cutoff valve to release the gases and vapors accumulated in said trap.

3. Apparatus for dispensing gas-free liquid, comprising a reservoir for liquid, a pump, a conduit connecting the reservoir to the pump inlet, a vapor trap connected in said conduit for accumulating gases and vapors entrained in the liquid flowing therethrough prior to reaching said pump, a discharge conduit receiving liquid from said pump, a cutoff valve in said discharge conduit, spring biasing said cutoff valve to closed position, means for holding said cutoff valve open against the spring including an expansible chamber having a movable wall connected to said cutoff valve for movement therewith and a conduit connecting said chamber to the pump inlet, so that said chamber is supplied with liquid under pressure when the pump is operating, the pressure of said liquid in said chamber being effective to move said chamber wall against said spring to open the cutoff valve and hold it open, means responsive to the quantity of gases and vapors accumulated in said trap for relieving the pressure in said chamber when said quantity exceeds a predetermined value to cause closure of said cutoff valve by said spring, and means effective at least when said cutoff valve is closed to remove accumulated gases and vapors from said trap.

4. Apparatus for dispensing gas-free liquid, as defined in claim 3, in which said quantity responsive means for relieving the pressure in said chamber includes a restriction in the conduit connecting the chamber to the pump outlet, a float in said vapor trap, and a bypass valve connected between the chamber and the vapor trap and operatively connected to the float to be opened thereby to permit a flow of liquid from said chamber to the vapor trap when the liquid in the vapor trap falls below a predetermined level.

5. Apparatus for dispensing gas-free liquid, comprising a reservoir for liquid, a pump located below the level of the reservoir, a conduit connecting the reservoir to the pump inlet so that the pump is fed by gravity, a vapor trap connected in said conduit for accumulating gases and vapors entrained in the liquid flowing therethrough prior to reaching said pump, a vapor discharge conduit leading from the upper end of the vapor trap to a point above the level of the liquid in the reservoir, a check valve in said vapor discharge conduit for preventing flow therethrough toward said vapor trap, a discharge conduit receiving liquid from said pump, a cutoff valve in said discharge conduit, a spring biasing said cutoff valve to closed position, means for holding said cutoff valve open against the spring including an expansible chamber having a movable wall connected to said cutoff valve for movement therewith and a conduit connecting said chamber to the pump outlet, so that said chamber is supplied with liquid under pressure when the pump is operating, the pressure of said liquid in said chamber being effective to move said chamber wall against said spring to open the cutoff valve and hold it open, a restriction in said last-mentioned conduit, means providing fluid communication between the downstream side of said restriction and the pump inlet, a bypass valve in said fluid communication means, a float in said vapor trap operatively connected to said bypass valve so as to open the valve when the liquid in the vapor trap falls below a predetermined level, said bypass valve being effective when open to relieve the pressure in said chamber so that the cutoff valve is closed by the spring, said reservoir and check valve being effective upon cutoff of the flow through said discharge conduit to supply liquid to the vapor trap and remove the trapped vapor therefrom, thereby raising the liquid in the trap above said predetermined level so that the float closes the bypass valve and the pump again delivers liquid under pressure to said chamber to open the cutoff valve.

6. Apparatus for dispensing measured quantities of liquid, comprising a pump, an inlet conduit for said pump, a vapor trap connected in said inlet conduit for removing gases and vapors entrained in the liquid prior to reaching said pump, a discharge conduit receiving liquid from said pump, a liquid flow meter in said discharge conduit, a cutoff valve in said discharge conduit, operating means for said cutoff valve including a stem extending from the valve through a rigid wall of the discharge conduit, a spring biasing said valve in a closing direction, means connected to said stem outside said conduit wall and operable in response to the pressure of liquid discharged from the pump to apply to the stem a force opposing said spring, said force being normally greater than the spring force and effective to open the cutoff valve, means responsive to variations in the liquid level in said vapor trap and operatively connected to said force applying means and effective when said liquid falls below a predetermined level to reduce said opposing force below that of the spring so that the spring is then effective to close the cutoff valve, and means effective at least when said cutoff valve is closed to remove accumulated gases and vapors from said trap.

7. Apparatus for dispensing measured quantities of liquid as defined in claim 6, in which: said opposing force applying means comprises a chamber having a movable wall connected to said stem so that an increase in pressure in the chamber moves the stem in a valve opening direction, and a conduit having a restriction therein and connecting the pump outlet to said chamber; and said liquid level operated means comprises a float in said vapor trap, a by-pass conduit connected between said chamber and the pump inlet, and a by-pass valve in the by-pass conduit and operatively connected to the float so that said by-pass valve opens when the liquid in the vapor trap falls below said predetermined level.

References Cited in the file of this patent

UNITED STATES PATENTS

| Number | Name | Date |
|---|---|---|
| 1,868,444 | Bechtold | July 19, 1932 |
| 2,164,441 | Bechtold | July 4, 1939 |
| 2,186,069 | Hazard | Jan. 9, 1940 |
| 2,303,378 | Moody | Dec. 1, 1942 |